United States Patent
Tai et al.

(10) Patent No.: US 10,486,468 B2
(45) Date of Patent: Nov. 26, 2019

(54) TERMINAL-MODIFIED CONJUGATED DIENE-VINYL AROMATIC HYDROCARBON COPOLYMER AND SYNTHESIS METHOD THEREOF, RUBBER COMPOSITION AND TIRE

(71) Applicant: Chi Mei Corporation, Tainan (TW)

(72) Inventors: Chia-Hon Tai, Tainan (TW); Kuan-Lin Hsieh, Tainan (TW)

(73) Assignee: Chi Mei Corporation, Tainan (TW)

( * ) Notice: Subject to any disclaimer, the term of this patent is extended or adjusted under 35 U.S.C. 154(b) by 142 days.

(21) Appl. No.: 15/786,615

(22) Filed: Oct. 18, 2017

(65) Prior Publication Data

US 2018/0171110 A1    Jun. 21, 2018

(30) Foreign Application Priority Data

Dec. 16, 2016  (TW) .............................. 105141716 A

(51) Int. Cl.
| | |
|---|---|
| *C08C 19/25* | (2006.01) |
| *B60C 1/00* | (2006.01) |
| *C08L 83/06* | (2006.01) |
| *C08L 9/06* | (2006.01) |
| *C08C 19/44* | (2006.01) |
| *C08C 19/22* | (2006.01) |

(52) U.S. Cl.
CPC ............... *B60C 1/00* (2013.01); *C08C 19/22* (2013.01); *C08C 19/44* (2013.01); *C08L 9/06* (2013.01); *C08L 83/06* (2013.01)

(58) Field of Classification Search
CPC .... C08L 83/10; C08F 8/00; C08F 8/08; C08F 8/10; C08F 236/00–08; C08C 19/25; C08C 19/44

See application file for complete search history.

(56) References Cited

U.S. PATENT DOCUMENTS

| | | | |
|---|---|---|---|
| 2006/0155076 A1* | 7/2006 | Nakamura | B60C 1/0008 525/331.9 |
| 2008/0275184 A1* | 11/2008 | Karato | B60C 1/0016 525/105 |
| 2016/0090475 A1* | 3/2016 | Nakatani | C08L 9/06 524/526 |

FOREIGN PATENT DOCUMENTS

TW    201425358    7/2014

* cited by examiner

*Primary Examiner* — Marc S Zimmer
(74) *Attorney, Agent, or Firm* — JCIPRNET

(57) ABSTRACT

The invention provides a terminal-modified conjugated diene-vinyl aromatic hydrocarbon copolymer and a synthesis method and application thereof. The synthesis method of the terminal-modified conjugated diene-vinyl aromatic hydrocarbon copolymer includes producing a conjugated diene-vinyl aromatic hydrocarbon copolymer having active terminals; and reacting the conjugated diene-vinyl aromatic hydrocarbon copolymer having the active terminals with a compound represented by formula (1) to produce the conjugated diene-vinyl aromatic hydrocarbon copolymer having terminals modified by the compound represented by formula (1).

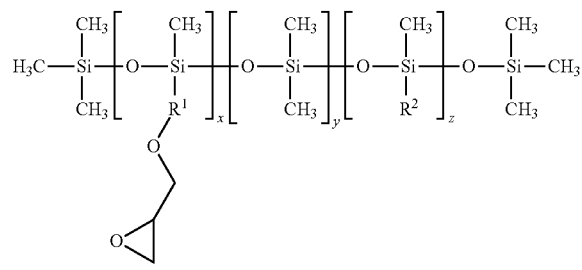

formula (1)

20 Claims, No Drawings

TERMINAL-MODIFIED CONJUGATED DIENE-VINYL AROMATIC HYDROCARBON COPOLYMER AND SYNTHESIS METHOD THEREOF, RUBBER COMPOSITION AND TIRE

CROSS-REFERENCE TO RELATED APPLICATION

This application claims the priority benefit of Taiwan application serial no. 105141716, filed on Dec. 16, 2016. The entirety of the above-mentioned patent application is hereby incorporated by reference herein and made a part of this specification.

BACKGROUND OF THE INVENTION

Field of the Invention

The invention relates to an olefin polymer, and more particularly, to a terminal-modified conjugated diene-vinyl aromatic hydrocarbon copolymer.

Description of Related Art

The conjugated diene-vinyl aromatic hydrocarbon copolymer can be used to make tires, and therefore in consideration of energy saving and traffic safety, properties such as rolling resistance and skid resistance thereof are very important. A known method includes adding carbon black in the conjugated diene-vinyl aromatic hydrocarbon copolymer to increase the strength of the tire.

However, in recent years, due to environmental issues such as gradual depletion of oil resource and global warming, the tire industry has begun developing techniques of replacing carbon black with white carbon (main component: SiO2, such as silica) to lower the rolling resistance of the tire and achieve the object of reducing energy loss. Since white carbon is less readily dispersed evenly in the conjugated diene-vinyl aromatic hydrocarbon copolymer compared to carbon black, the compatibility and even mixing of white carbon and the conjugated diene-vinyl aromatic hydrocarbon copolymer need to be increased.

A known method includes adding a polysiloxane modifier (such as BY 16-876 made by Dow Corning Toray) in the synthesis reaction of the conjugated diene-vinyl aromatic hydrocarbon copolymer to obtain a modified conjugated diene-vinyl aromatic hydrocarbon copolymer. However, the mixing compatibility effect of the modified conjugated diene-vinyl aromatic hydrocarbon copolymer with white carbon is still insufficient. Therefore, how to obtain a modified conjugated diene-vinyl aromatic hydrocarbon copolymer having high mixing compatibility with white carbon and provide low rolling resistance and excellent skid resistance to a tire made from the copolymer is an important object for those skilled in the art.

SUMMARY OF THE INVENTION

The invention provides a terminal-modified conjugated diene-vinyl aromatic hydrocarbon copolymer and a synthesis method thereof, a rubber composition, and a tire.

The invention provides a synthesis method of the terminal-modified conjugated diene-vinyl aromatic hydrocarbon copolymer including producing a conjugated diene-vinyl aromatic hydrocarbon copolymer having active terminals including a structural unit formed by a conjugated diene monomer and a structural unit formed by a vinyl aromatic hydrocarbon monomer, wherein a weight ratio of the structural unit formed by the conjugated diene monomer to the structural unit formed by the vinyl aromatic hydrocarbon monomer is from 2:1 to 5:1; and reacting the conjugated diene-vinyl aromatic hydrocarbon copolymer having the active terminals with a compound represented by formula (1) to produce a conjugated diene-vinyl aromatic hydrocarbon copolymer having terminals modified by the compound represented by formula (1);

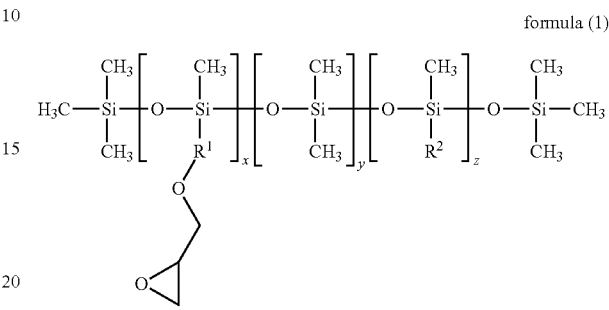

formula (1)

wherein $R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, and a plurality of $R^2$ can be the same or different.

The invention also provides a terminal-modified conjugated diene-vinyl aromatic hydrocarbon copolymer including a conjugated diene-vinyl aromatic hydrocarbon copolymer having terminals modified by the compound represented by formula (1) produced by modifying a conjugated diene-vinyl aromatic hydrocarbon copolymer having active terminals with the compound represented by formula (1), wherein the conjugated diene-vinyl aromatic hydrocarbon copolymer having the active terminals is formed by the polymerization of a conjugated diene monomer and a vinyl aromatic hydrocarbon monomer in the presence of an organic alkali metal compound,

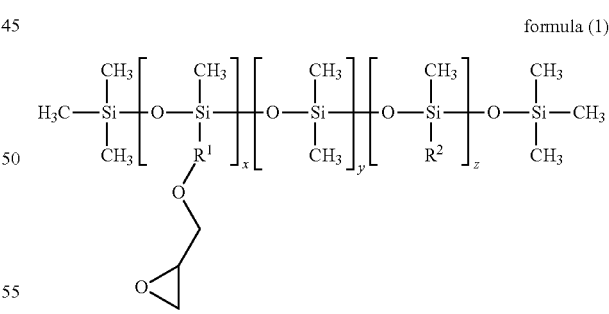

formula (1)

wherein $R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and in the conjugated diene-vinyl aromatic hydrocarbon copolymer having the terminals modified by the compound represented by formula (1), the weight ratio of the structural unit formed by the conjugated diene monomer to the structural unit formed by the vinyl aromatic hydrocarbon monomer is from 2:1 to 5:1.

The invention also provides a rubber composition including white carbon and the terminal-modified conjugated diene-vinyl aromatic hydrocarbon copolymer above.

The invention also provides a tire including the rubber composition above.

The invention also provides a synthesis method of the terminal-modified conjugated diene-vinyl aromatic hydrocarbon copolymer including producing a conjugated diene-vinyl aromatic hydrocarbon copolymer having active terminals including a structural unit formed by a conjugated diene monomer and a structural unit formed by a vinyl aromatic hydrocarbon monomer, wherein a weight ratio of the structural unit formed by the conjugated diene monomer to the structural unit formed by the vinyl aromatic hydrocarbon monomer is from 2:1 to 5:1; reacting the conjugated diene-vinyl aromatic hydrocarbon copolymer having the active terminals with a first modifier to produce an intermediate product; and reacting the conjugated diene-vinyl aromatic hydrocarbon copolymer having the active terminals remaining in the intermediate product with a second modifier to produce a terminal-modified conjugated diene-vinyl aromatic hydrocarbon copolymer, wherein the first modifier is a compound containing a

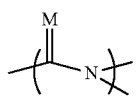

group, M is a sulfur atom or an oxygen atom, and the second modifier is a compound represented by formula (1) below,

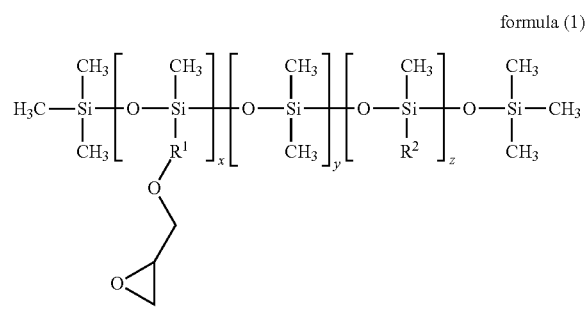

formula (1)

$R^1$ is a substituted or unsubstituted $C_2$ to $C_4$ alkylene group, $R^2$ is a group including a substituted or unsubstituted $C_2$ to $C_4$ alkylene group, $-(O-C_2H_4)-$, and $-OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and based on a total amount of 100 parts by weight of the conjugated diene monomer and the vinyl aromatic hydrocarbon monomer, the amount of the first modifier is 0.010 parts by weight to 0.070 parts by weight and the amount of the second modifier is 0.430 parts by weight to 0.520 parts by weight.

The invention also provides a terminal-modified conjugated diene-vinyl aromatic hydrocarbon copolymer produced by polymerizing a conjugated diene monomer and a vinyl aromatic hydrocarbon monomer to form a conjugated diene-vinyl aromatic hydrocarbon copolymer and then modifying with a first modifier and a second modifier, wherein in the terminal-modified conjugated diene-vinyl aromatic hydrocarbon copolymer, the weight ratio of the structural unit formed by the conjugated diene monomer to the structural unit formed by the vinyl aromatic hydrocarbon monomer is from 2:1 to 5:1, the first modifier is a compound containing a

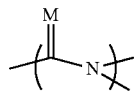

group, M is a sulfur atom or an oxygen atom, and the second modifier is a compound represented by formula (1) below,

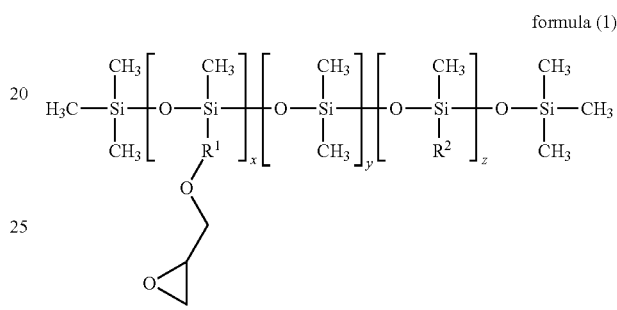

formula (1)

$R^1$ is a substituted or unsubstituted $C_2$ to $C_4$ alkylene group, $R^2$ is a group including a substituted or unsubstituted $C_2$ to $C_4$ alkylene group, $-(O-C_2H_4)-$, and $-OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and based on a total amount of 100 parts by weight of the structural unit formed by the conjugated diene monomer and the structural unit formed by the vinyl aromatic hydrocarbon monomer, the amount of the first modifier is 0.010 parts by weight to 0.070 parts by weight and the amount of the second modifier is 0.430 parts by weight to 0.520 parts by weight.

The invention also provides a rubber composition including carbon black, white carbon, and the terminal-modified conjugated diene-vinyl aromatic hydrocarbon copolymer above.

The invention also provides a tire including the rubber composition above.

Based on the above, the invention provides a terminal-modified conjugated diene-vinyl aromatic hydrocarbon copolymer and a synthesis method thereof, a rubber composition, and a tire. The rubber composition obtained from the terminal-modified conjugated diene-vinyl aromatic hydrocarbon copolymer of the invention has excellent skid resistance and low rolling resistance, and has very good compatibility with carbon black and white carbon and can be made into a tire having excellent skid resistance and low rolling resistance.

In order to make the aforementioned features and advantages of the disclosure more comprehensible, embodiments accompanied with figures are described in detail below.

DESCRIPTION OF THE EMBODIMENTS

Hereinafter, the synthesis method of the terminal-modified conjugated diene-vinyl aromatic hydrocarbon copolymer is described in detail according to embodiments of the invention.

In the present specification, if a particular group is not specified to be substituted, then the group can represent a substituted or an unsubstituted group. For instance, "alkyl group" can represent a substituted or an unsubstituted alkyl group. In addition, when a particular group is described with "$C_x$", it means that the main chain of the group has an X number of carbon atoms.

In the present specification, structures of compounds are sometimes represented by skeleton formulas. Such representation can omit carbon atoms, hydrogen atoms, and carbon-hydrogen bonds. Of course, structural formulas with clear illustrations of functional groups are definitive.

In the specification, "phr (part per hundred rubber)" is sometimes used as a unit of additive amount, is a common terminology in the field of rubber synthesis, and means "parts by weight added per 100 parts by weight of rubber". Moreover, the so-called "rubber" here refers to a conjugated diene-vinyl aromatic hydrocarbon copolymer. Moreover, in the specification, in descriptions relating to polymerization reaction, the weight of the conjugated diene-vinyl aromatic hydrocarbon copolymer and the sum of the weights of the conjugated diene monomer and the vinyl aromatic hydrocarbon monomer are regarded to be the same. In other words, when phr is used to represent the amount of the additive in the polymerization reaction, the basis thereof can be 100 parts by weight of the conjugated diene-vinyl aromatic hydrocarbon copolymer or 100 parts by weight of the conjugated diene monomer and the vinyl aromatic hydrocarbon monomer.

Synthesis Method of Terminal-modified Conjugated Diene-vinyl Aromatic Hydrocarbon Copolymer The invention provides a synthesis method of the terminal-modified conjugated diene-vinyl aromatic hydrocarbon copolymer including reacting a weight ratio of a conjugated diene monomer to a vinyl aromatic hydrocarbon monomer at 2:1 to 5:1 in the presence of an organic alkali metal compound to produce a conjugated diene-vinyl aromatic hydrocarbon copolymer having active terminals including a structural unit formed by a conjugated diene monomer and a structural unit formed by a vinyl aromatic hydrocarbon monomer, wherein a weight ratio of the structural unit formed by the conjugated diene monomer to the structural unit formed by the vinyl aromatic hydrocarbon monomer is from 2:1 to 5:1; and reacting the conjugated diene-vinyl aromatic hydrocarbon copolymer having the active terminals with a compound represented by formula (1) to produce a conjugated diene-vinyl aromatic hydrocarbon copolymer having terminals modified by the compound represented by formula (1);

formula (1)

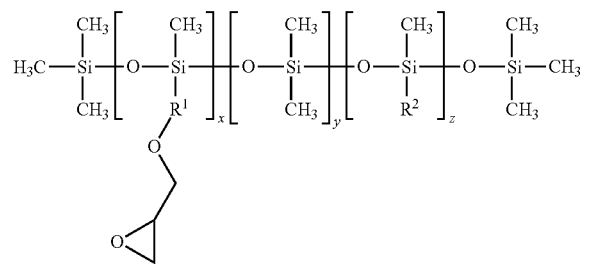

wherein $R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, and a plurality of $R^2$ can be the same or different.

Hereinafter, the monomers and agents used in the synthesis method above are described in detail.

Conjugated Diene Monomer

In an embodiment, the conjugated diene monomer can be 1,3-butadiene, isoprene, 1,3-pentadiene, 2-ethyl-1,3-butadiene, 2,3-dimethyl-butadiene, 2-methyl-pentadiene, 4-methyl-pentadiene, 2,4-hexadiene, or a combination thereof.

The conjugated diene-vinyl aromatic hydrocarbon copolymer obtained from polymerization includes a conjugated diene structural unit and a vinyl aromatic hydrocarbon structural unit. Here, the "structural unit" (or monomer unit) refers to the structure formed by the polymerization reaction of the conjugated diene monomer or the vinyl aromatic hydrocarbon monomer.

In an embodiment, the conjugated diene structural unit can include a 1,3-butadiene structural unit, isoprene structural unit, 1,3-pentadiene structural unit, 2-ethyl-1,3-butadiene structural unit, 2,3-dimethylbutadiene structural unit, 2-methylpentadiene structural unit, 4-methylpentadiene structural unit, 2,4-hexadiene structural unit, or a combination thereof.

In an embodiment, the conjugated diene monomer can be reacted in 1,4-polymerization and/or 1,2-polymerization to form a 1,4-structural unit (also referred to as 1,4-vinyl structure, hereinafter 1,4-structure) and/or a 1,2-structural unit (also referred to as 1,2-vinyl structure, hereinafter 1,2-structure). Specifically, "1,4-polymerization" refers to the bonding of a conjugated diene monomer to other monomers through carbons at positions 1 and 4 of the conjugated diene monomer. The 1,4-structure obtained in this manner can be further divided into a cis-structure and a trans-structure. Similarly, the "1,2-polymerization" refers to the bonding of a conjugated diene monomer to other monomers through carbons at positions 1 and 2 of the conjugated diene monomer. The 1,2-structure obtained from 1,2-polymerization is a structure having a vinyl group at the side chain. The 1,4-structure and the 1,2-structure may co-exist in a polymer chain. For instance, when polymerization is performed with a 1,3-butadiene monomer, a 1,2-polybutadiene structural unit or a 1,4-polybutadiene structural unit can be produced.

In an embodiment, the proportion of the 1,2-structure in the entire conjugated diene structural unit (i.e., the sum of the 1,4-structural unit and the 1,2-structural unit) can be between 10% and 90%. In an embodiment, the proportion of the 1,2-structure in the conjugated diene structural unit is between 50% and 90%, preferably between 55% and 70%.

Vinyl Aromatic Hydrocarbon Monomer

In an embodiment, the vinyl aromatic hydrocarbon monomer can be styrene, α-methylstyrene, or a combination thereof.

In an embodiment, the conjugated diene-vinyl aromatic hydrocarbon copolymer obtained from polymerization includes a conjugated diene structural unit and a vinyl aromatic hydrocarbon structural unit. Here, the "structural unit" (or monomer unit) refers to the structure formed by the polymerization reaction of the conjugated diene monomer or the vinyl aromatic hydrocarbon monomer.

In an embodiment, the vinyl aromatic hydrocarbon structural unit can include a styrene structural unit, an α-methylstyrene structural unit, or a combination thereof.

Organic Alkali Metal Compound

In an embodiment, the organic alkali metal compound is, for instance, ethyl lithium, n-propyl lithium, isopropyl lithium, n-butyl lithium, n-pentyl lithium, phenyl lithium, tolyl lithium, or a combination thereof. In the invention, the organic alkali metal compound is used as the initiator of the polymerization reaction.

Compound Represented by Formula (1)

In an embodiment, the compound represented by formula (1) has the structure shown below:

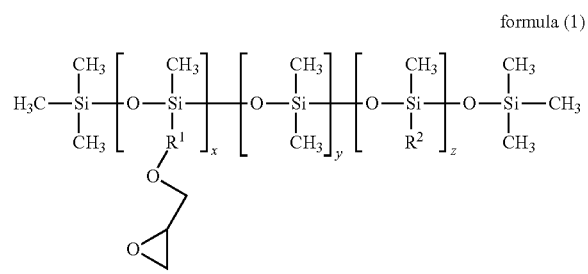

formula (1)

$R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, and a plurality of $R^2$ can be the same or different.

In an embodiment of the invention, $R^2$ is —($C_2H_4$)—(O—$C_2H_4$)$_n$—$OR^3$, $R^3$ is hydrogen or a substituted or unsubstituted $C_1$ to $C_3$ alkyl group, and n is 3 to 8.

In an embodiment, in the compound represented by formula (1), the weight-average molecular weight is about 40000, x is 25 to 35, preferably 27 to 33, and most preferably 29 to 31; y is 220 to 350, preferably 250 to 300, and most preferably 260 to 280; z is 25 to 35, preferably 27 to 33, and most preferably 29 to 31, and n is 3 to 8, preferably 5 to 6 (the molecular weight of the polyethylene oxide functional group is about 350).

In an embodiment of the invention, based on a total amount of 100 parts by weight of the conjugated diene monomer and the vinyl aromatic hydrocarbon monomer, the amount of the compound represented by formula (1) can be 0.001 parts by weight to 1 parts by weight.

Solvent

In an embodiment, the polymerization reaction can be performed in the presence of a solvent. The solvent can include a nonpolar solvent such as (but not limited to) aliphatic hydrocarbon such as pentane, hexane, or heptane; alicyclic hydrocarbon such as cyclopentane, cyclohexane, methyl cyclopentane, or methyl cyclohexane; aromatic hydrocarbon such as benzene, toluene, or xylene, or a mixture of the solvents.

Branching Agent

In an embodiment, the synthesis method of the terminal-modified conjugated diene-vinyl aromatic hydrocarbon copolymer further includes adding a branching agent in the reaction of the conjugated diene monomer and the vinyl aromatic hydrocarbon monomer to increase the active sites for modification on a single molecular chain to improve the effect of modification. The branching agent can be polyepoxide such as epoxidized linseed oil; polyester such as diethyl adipate; polyhalide such as silicon tetrachloride; polyisocyanate such as benzene-1,2,4-triisocyanate; polyimine such as tri(1-aziridinyl)phosphine oxide; polyaldehyde such as 1,4,7-naphthalene tricarboxaldehyde; polyketone such as 2,4,6-heptanetrione; polyanhydride such as pyromellitic dianhydride; a polyvinylbenzene compound such as divinylbenzene (DVB), or a combination of the compounds. In the invention, DVB is preferably used.

Microstructure Modifier

In an embodiment, the polymerization reaction of the conjugated diene monomer and the vinyl aromatic hydrocarbon monomer can be performed in the presence of a microstructure modifier. The use of the microstructure modifier can randomly copolymerize the conjugated diene monomer and the vinyl aromatic hydrocarbon monomer. The microstructure modifier can be a polar compound, and in an embodiment, the microstructure modifier can be used as a vinylating agent or a 1,2-vinyl configuration agent.

In an embodiment, the microstructure modifier includes (but is not limited to) ether such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, or 2,2-bis(2-tetrahydrofuryl)propane; a tertiary amine compound such as tetramethylethylenediamine, dipiperidine ethane, trimethylamine, triethylamine, pyridine, or quinuclidine; an alkali metal alkoxide compound such as potassium t-pentaoxide, potassium t-butoxide, sodium t-butoxide, or sodium t-pentaoxide; a phosphine compound such as triphenyl phosphine; an alkyl sulfonic acid compound or an aryl sulfonic acid compound. The polar compounds can be used alone or as a mixture of two or more.

In an embodiment, the amount of the microstructure modifier can be selected according to actual demand and the effect of the modified structure thereof. In general, the microstructure modifier can in actuality be 0.01 moles to 100 moles based on 1 mole of the polymerization initiator. In an embodiment, the amount of the microstructure modifier can be 0.05 phr to 0.5 phr. According to the amount of the desired 1,2-structure, a polar compound (vinylating agent) can be used in a suitable amount as the microstructure modifier.

Poor Solvent

In an embodiment, a poor solvent of the terminal-modified conjugated diene-vinyl aromatic hydrocarbon copolymer can be added in the reaction system, such as alcohol (such as methanol, ethanol, or isopropanol) such that the terminal-modified conjugated diene-vinyl aromatic hydrocarbon copolymer is precipitated or such that the terminal-modified conjugated diene-vinyl aromatic hydrocarbon copolymer is isolated from the mixture by removing the solvent using hot water having a higher boiling point temperature than the solvent or water vapor.

Terminal-modified Conjugated Diene-vinyl Aromatic Hydrocarbon Copolymer

The invention also provides a terminal-modified conjugated diene-vinyl aromatic hydrocarbon copolymer including a conjugated diene-vinyl aromatic hydrocarbon copolymer having terminals modified by the compound represented by formula (1) produced by modifying a conjugated diene-vinyl aromatic hydrocarbon copolymer having active terminals with the compound represented by formula (1), wherein the conjugated diene-vinyl aromatic hydrocarbon copolymer having the active terminals is formed by the polymerization of a conjugated diene monomer and a vinyl aromatic hydrocarbon monomer in the presence of an organic alkali metal compound,

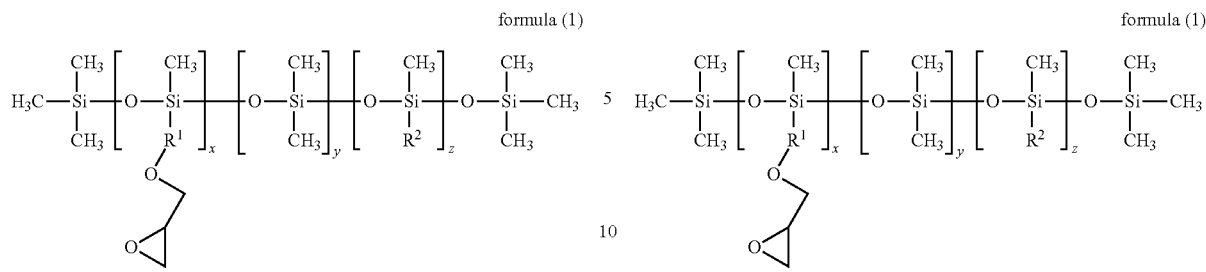

formula (1)

wherein $R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and in the conjugated diene-vinyl aromatic hydrocarbon copolymer having the terminals modified by the compound represented by formula (1), the weight ratio of the structural unit formed by the conjugated diene monomer to the structural unit formed by the vinyl aromatic hydrocarbon monomer is from 2:1 to 5:1.

The conjugated diene monomer, vinyl aromatic hydrocarbon monomer, organic alkali metal compound, and compound represented by formula (1) are as recited in the above and are not repeated herein. An agent such as a solvent, branching agent, microstructure modifier, or poor solvent can also be added in the manufacturing process of the terminal-modified conjugated diene-vinyl aromatic hydrocarbon copolymer, and the amount, type, and structure thereof are as recited in the above and are not repeated herein.

Synthesis Method of Terminal-modified Conjugated Diene-vinyl Aromatic Hydrocarbon Copolymer The invention also provides a synthesis method of another terminal-modified conjugated diene-vinyl aromatic hydrocarbon copolymer including reacting a weight ratio of a conjugated diene monomer to a vinyl aromatic hydrocarbon monomer at 2:1 to 5:1 in the presence of an organic alkali metal compound to produce a conjugated diene-vinyl aromatic hydrocarbon copolymer having active terminals including a structural unit formed by a conjugated diene monomer and a structural unit formed by a vinyl aromatic hydrocarbon monomer, wherein a weight ratio of the structural unit formed by the conjugated diene monomer to the structural unit formed by the vinyl aromatic hydrocarbon monomer is from 2:1 to 5:1; reacting the conjugated diene-vinyl aromatic hydrocarbon copolymer having the active terminals with a first modifier to produce an intermediate product; and reacting the conjugated diene-vinyl aromatic hydrocarbon copolymer having the active terminals remaining in the intermediate product with a second modifier to produce a terminal-modified conjugated diene-vinyl aromatic hydrocarbon copolymer, wherein the first modifier is a compound containing a

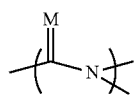

group, M is a sulfur atom or an oxygen atom, and the second modifier is a compound represented by formula (1) below, $R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and based on a total amount of 100 parts by weight of the conjugated diene monomer and the vinyl aromatic hydrocarbon monomer, the amount of the first modifier is 0.010 parts by weight to 0.070 parts by weight and the amount of the second modifier is 0.430 parts by weight to 0.520 parts by weight.

The conjugated diene monomer, vinyl aromatic hydrocarbon monomer, organic alkali metal compound, and compound represented by formula (1) are as recited in the above and are not repeated herein. An agent such as a solvent, branching agent, microstructure modifier, or poor solvent can also be added in the manufacturing process of the terminal-modified conjugated diene-vinyl aromatic hydrocarbon copolymer, and the amount, type, and structure thereof are as recited in the above and are not repeated herein.

First Modifier

In an embodiment, the first modifier is a compound containing a

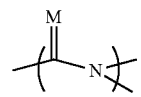

group, and M is a sulfur atom or an oxygen atom. The compound containing the

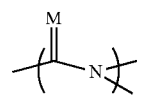

group is, for instance, an amide compound, an imide compound, a lactam compound, a urea compound, or an isocyanuric acid derivative.

In an embodiment, the amide compound includes formamide, N,N-dimethylformamide, acetamide, N,N-dimethylaminoacetamide, N,N-dimethyl-N',N'-dimethylaminoacetamide, N,N-dimethyl-N'-ethylaminoacetamide, acrylamide, N,N-dimethylaciylamide, N,N-dimethylmethacrylamide, nicotinamide, isonicotinamide, picolinic acid amide, N,N-dimethylisonicotinamide, succinic acid amide, phthalic acid amide, N,N,N',N'-tetramethylphthalic acid amide, oxamide, N,N,N',N'-tetramethyloxamide, N,N-dimethyl-2-furan carboxylic acid amide, quinoline-2-carboxylic acid amide, N-ethyl-N-methyl-quinoline carboxylic acid amide, or a similar compound thereof.

In an embodiment, the imide compound includes succinic imide, N-methylsuccinic imide, maleimide, phthalimide, N-methylphthalimide, 1,2-cyclohexanedicarboxyimide, or a similar compound thereof.

In an embodiment, the lactam compound includes ε-caprolactam, N-methyl-ε-caprolactam, 2-pyrrolidone, N-methyl-2-pyrrolidone, 2-piperidone, N-methyl-2-piperidone, 2-quinolone, N-methyl-2-quinolone, or a similar compound thereof.

In an embodiment, the urea compound includes urea, N,N'-dimethylurea, N,N'-doethylurea, N,N,N',N'-tetramethylurea, N,N-dimethyl-N',N'-diphenylurea, or a similar-compound thereof. The carbamate derivative includes methyl carbamate, N,N-dimethyl methyl carbamate, or a similar compound thereof. The isocyanuric acid derivative includes isocyanuric acid or a similar compound thereof.

In an embodiment, the first modifier can include an amide compound, an imide compound, a lactam compound, a urea compound, an isocyanuric acid derivative, or a combination thereof.

In an embodiment, the first modifier is preferably formamide.

The first modifier can be used alone or as a mixture of two or more.

In an embodiment of the invention, based on a total amount of 100 parts by weight of the conjugated diene monomer and the vinyl aromatic hydrocarbon monomer, preferably, the amount of the first modifier is 0.010 parts by weight to 0.030 parts by weight and the amount of the second modifier is 0.480 parts by weight to 0.520 parts by weight.

In an embodiment of the invention, based on a total amount of 100 parts by weight of the conjugated diene monomer and the vinyl aromatic hydrocarbon monomer, the total amount of the first modifier and the second modifier can be 0.51 parts by weight to 0.55 parts by weight.

Terminal-modified Conjugated Diene-vinyl Aromatic Hydrocarbon Copolymer

The invention also provides another terminal-modified conjugated diene-vinyl aromatic hydrocarbon copolymer produced by polymerizing a conjugated diene monomer and a vinyl aromatic hydrocarbon monomer to form a conjugated diene-vinyl aromatic hydrocarbon copolymer and then modifying with the first modifier and the second modifier in order, wherein in the terminal-modified conjugated diene-vinyl aromatic hydrocarbon copolymer, the weight ratio of the structural unit formed by the conjugated diene monomer to the structural unit formed by the vinyl aromatic hydrocarbon monomer is from 2:1 to 5:1, the first modifier is a compound containing the

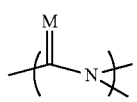

group, M is a sulfur atom or an oxygen atom, and the second modifier is a compound represented by formula (1) below,

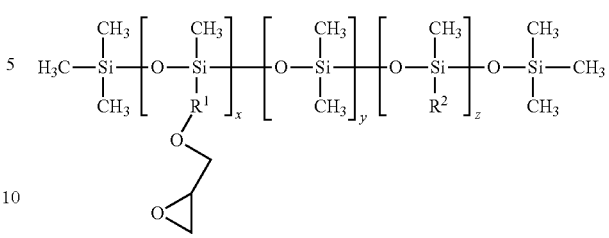

formula (1)

$R^1$ is a substituted or unsubstituted $C_2$ to $C_4$ alkylene group, $R^2$ is a group including a substituted or unsubstituted $C_2$ to $C_4$ alkylene group, —(O—$C_2H_4$)—, and —$OR^3$, $R^3$ is hydrogen or a substituted or unsubstituted $C_1$ to $C_3$ alkyl group, x is 25 to 35, y is 220 to 350, z is 25 to 35, a plurality of $R^1$ can be the same or different, a plurality of $R^2$ can be the same or different, and based on a total amount of 100 parts by weight of the structural unit formed by the conjugated diene monomer and the structural unit formed by the vinyl aromatic hydrocarbon monomer, the amount of the first modifier is 0.010 parts by weight to 0.070 parts by weight and the amount of the second modifier is 0.430 parts by weight to 0.520 parts by weight.

The conjugated diene monomer, vinyl aromatic hydrocarbon monomer, organic alkali metal compound, first modifier, and compound represented by formula (1) are as recited in the above and are not repeated herein. An agent such as a solvent, branching agent, microstructure modifier, or poor solvent can also be added in the manufacturing process of the terminal-modified conjugated diene-vinyl aromatic hydrocarbon copolymer, and the amount, type, and structure thereof are as recited in the above and are not repeated herein.

In an embodiment of the invention, based on a total amount of 100 parts by weight of the structural unit formed by the conjugated diene monomer and the structural unit formed by the vinyl aromatic hydrocarbon monomer, preferably, the amount of the first modifier is 0.010 parts by weight to 0.030 parts by weight and the amount of the second modifier is 0.480 parts by weight to 0.520 parts by weight.

Rubber Composition

In an embodiment, the invention also provides a rubber composition including white carbon and the terminal-modified conjugated diene-vinyl aromatic hydrocarbon copolymer above. The terminal-modified conjugated diene-vinyl aromatic hydrocarbon copolymer is modified by using, for instance, the compound represented by formula (1).

The invention also provides a rubber composition including carbon black, white carbon, and the terminal-modified conjugated diene-vinyl aromatic hydrocarbon copolymer above. The terminal-modified conjugated diene-vinyl aromatic hydrocarbon copolymer is modified by using, for instance, the first modifier and the compound represented by formula (1).

The invention also provides a manufacturing method of a rubber composition. In an embodiment, the manufacturing method of the rubber composition includes mixing rubber and a silicon-containing material to obtain a rubber composition, wherein the rubber includes any of the terminal-modified conjugated diene-vinyl aromatic hydrocarbon copolymers described in detail above. In an embodiment, the rubber includes the terminal-modified conjugated diene-vinyl aromatic hydrocarbon copolymer and another unmodified conjugated diene-vinyl aromatic hydrocarbon copolymer, and the other unmodified conjugated diene-vinyl aromatic hydrocarbon copolymer can be the same as or different from the unmodified conjugated diene-vinyl aromatic hydrocarbon copolymer used for forming the terminal-modified conjugated diene-vinyl aromatic hydrocarbon copolymer.

The terminal-modified conjugated diene-vinyl aromatic hydrocarbon copolymer and the other unmodified conjugated diene-vinyl aromatic hydrocarbon copolymer can respectively contain a conjugated diene structural unit and a vinyl aromatic hydrocarbon structural unit, wherein the conjugated diene structural unit contains a vinyl structure (1,2-structure). In an embodiment, the percentage of the vinyl structure in the conjugated diene structural unit of the terminal-modified conjugated diene-vinyl aromatic hydrocarbon copolymer is substantially the same as the percentage of the vinyl structure in the conjugated diene structural unit of the other unmodified conjugated diene-vinyl aromatic hydrocarbon copolymer.

Various agents or additives commonly used in the rubber industry can also be added in a rubber composition containing the terminal-modified conjugated diene-vinyl aromatic hydrocarbon copolymer of the invention as needed. Substances that can be added to the rubber composition include a filler material, antioxidant, coupling agent, vulcanization aid (vulcanization activator or vulcanization accelerator), vulcanizing agent, anti-aging agent, or operating oil.

In an embodiment, the filler material can be, for instance, a silicon-containing material such as white carbon, and the amount of the white carbon can be 10 parts by weight to 100 parts by weight per 100 parts by weight of the rubber used, preferably 20 parts by weight to 90 parts by weight. Carbon black can also be used with the white carbon, and the amount of the carbon black can be 2 parts by weight to 100 parts by weight per 100 parts by weight of the rubber used, preferably 5 parts by weight to 90 parts by weight. A suitable antioxidant can be a phenolic compound having at least one hindered phenol functional group such as IRGANOX® 1076 made by CIBA. Alternatively, the antioxidant can be a dialkylphenyl triphosphite antioxidant; an amination antioxidant selected from naphthylamine, diphenylamine, and p-phenylenediamine; a phenolic antioxidant selected from trialkylphenol, hydroquinone, and polyphenol. The amount of the antioxidant can be 0.2 parts by weight to 1 parts by weight per 100 parts by weight of the rubber used.

The coupling agent is, for instance, bis-(3-triethoxysilylpropyl)tetrasulfide, bis-(3-triethoxysilylpropyl)disulfide, bis-(2-triethoxysilylethyl)tetrasulfide, 3-mercaptopropyltriethoxysilane, 3-triethoxysilyl propyl-N,N-dimethylthiocarbamoyl tetrasulfide, or 3-triethoxysilylpropyl benzothiazole tetrasulfide, and the amount of the coupling agent can be 1 parts by weight to 15 parts by weight per 100 parts by weight of the rubber used, preferably 5 parts by weight to 10 parts by weight.

The vulcanization aid includes a vulcanization activator and a vulcanization accelerator.

The vulcanization activator is, for instance, zinc oxide or stearic acid.

A suitable vulcanization accelerator can be mercaptobenzthiazole, sulfenamide, guanidine, dithiocarbamate, thiourea, or thiocarbonate. Preferably, a sulfenamide accelerator is used, such as cyclohexylbenzothiazole sulfenamide and/or dicyclohexylbenzothiazole sulfenamide, and/or butylbenzothiazole sulfenamide. N-cyclohexyl-2-benzothiazole sulfenamide (CBS) and diphenyl guanidine (DPG) are preferred.

The vulcanizing agent is, for instance, a sulfur or organic sulfur provider. The total amount of the vulcanization aid (vulcanization activator and vulcanization accelerator) and the vulcanizing agent can be 0.1 parts by weight to 15 parts by weight per 100 parts by weight of the rubber used, preferably 0.5 parts by weight to 5 parts by weight.

The anti-aging agent is, for instance, N-(1,3-dimethylbutyl)-N'-phenyl-1,4-phenylendiamine (6PPD), and the amount of the anti-aging agent can be 1 parts by weight to 10 parts by weight per 100 parts by weight of the rubber used.

The invention also provides a tire including the rubber composition above.

EXAMPLES

Example 1

Synthesis of Terminal-modified Conjugated Diene-vinyl Aromatic Hydrocarbon Copolymer First, 800 g of cyclohexane was added in a reaction vessel as the solvent, and the temperature of the reaction system was maintained at 45° C. Next, 0.64 g of 2,2-di(2-tetrahydrofuryl)propane (DTHFP) was added in the reaction vessel as the microstructure modifier. Next, 0.08 g of n-butyl lithium was added in the reaction vessel as the initiator of the polymerization reaction. Next, 44.7 g of styrene used as the vinyl aromatic hydrocarbon monomer and 168.3 g of 1,3-butadiene used as the conjugated diene monomer were added in the reaction vessel to perform a polymerization reaction. Next, 7.46 g of 1,3-butadiene was added to react. At this point, after sampling and removing the solvent, the content of the 1,2-structure in the copolymer was measured using IR or NMR. The results show that, the proportion of the 1,2-structure in the entire butadiene structural unit is 63%. The styrene structural unit of the copolymer accounts for about 21 wt % of the entire butadiene structural unit and the entire styrene structural unit, and the butadiene structural unit accounts for about 79 wt % of the entire butadiene structural unit and the entire styrene structural unit.

After about 5 minutes, 0.53 parts by weight of the compound represented by formula (1) was added as the modifier, and after 10 minutes of reaction, cyclohexane was removed using hot water, and then a terminal-modified conjugated diene-vinyl aromatic hydrocarbon copolymer was obtained after drying.

Preparation of Rubber Composition 100 parts by weight of the terminal-modified conjugated diene-vinyl aromatic hydrocarbon copolymer above and the substances below were mixed by a Banbury mixer. White carbon (60 parts by weight), oil (10 parts by weight), antioxidant (1 parts by weight), zinc oxide (3 parts by weight), and steric acid (2 parts by weight) were added and mixed. The mixture was discharged after the temperature was increased to 150° C. and then aged for 24 hours. 1.8 parts by weight of CBS, 1.7 parts by weight of DPG, and 1.7 parts by weight of sulfur were added to the discharged gel mixture in a roller mixer for vulcanization to obtain a rubber composition. The material information used in the preparation of the rubber composition is as follows:

a. White carbon (silica, 7000GR, made by ULTRASIL EVONIK)
b. Oil (treated distillate aromatic extract (TDAE), Vivtec 500, made by H&R)
c. Antioxidant (IRGANOX® 1076, made by CIBA)
d. Zinc oxide (ZnO, made by HA)
e. Stearic acid (TPSA1865)

f. N-cyclohexyl-2-benzothiazole sulfenamide (CBS, made by FLEXSYS)
g. Diphenyl guanidine (DPG, made by FLEXSYS)
h. Sulfur (Triangle Brand)

Comparative Example 1

The terminal-modified conjugated diene-vinyl aromatic hydrocarbon copolymer and rubber composition of Comparative Example 1 were prepared with the same steps as Example 1. However, the difference is: the compound represented by formula (1) was replaced by BY-16-876 (made by Dow Corning Toray) as the modifier.
The structure of BY-16-876 is as shown below:

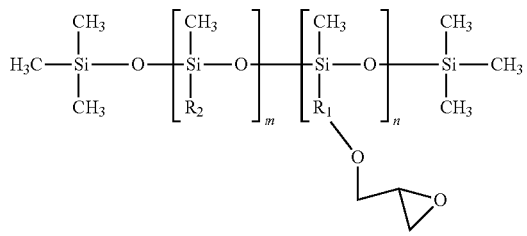

$R_1$ is a $C_2$ to $C_4$ alkylene group, $R_2$ is —$(CH_2)_3$—(O—$C_2H_4)_p$—(O—CH)$CH_3)CH_2)_q$—$OR_3$, $R_3$ is hydrogen or a $C_1$ to $C_6$ alkyl group, m is an integer of 5 to 30, n is an integer of 5 to 35, and p and q are respectively integers of 2 to 30.

Example 2

Synthesis of Terminal-modified Conjugated Diene-vinyl Aromatic Hydrocarbon Copolymer First, 800 g of cyclohexane was added in a reaction vessel as the solvent, and the temperature of the reaction system was maintained at 45° C. Next, 0.64 g of 2,2-di(2-tetrahydrofuryl)propane (DTHFP) was added in the reaction vessel as the microstructure modifier. Next, 0.08 g of n-butyl lithium was added in the reaction vessel as the initiator of the polymerization reaction. Next, 44.7 g of styrene used as the vinyl aromatic hydrocarbon monomer and 168.3 g of 1,3-butadiene used as the conjugated diene monomer were added in the reaction vessel to perform a polymerization reaction. Next, 7.46 g of 1,3-butadiene was added to react. At this point, after sampling and removing the solvent, the content of the 1,2-structure in the copolymer was measured using IR or NMR. The results show that, the proportion of the 1,2-structure in the entire butadiene structural unit is 63%. The styrene structural unit of the copolymer accounts for about 21 wt % of the entire butadiene structural unit and the entire styrene structural unit, and the butadiene structural unit accounts for about 79 wt % of the entire butadiene structural unit and the entire styrene structural unit.

After about 5 minutes, 0.012 parts by weight of formamide based on a total amount of 100 parts by weight of the conjugated diene monomer and the vinyl aromatic hydrocarbon monomer was added as the first modifier, and after 10 minutes of reaction, 0.511 parts by weight of the compound represented by formula (1) was added as the second modifier, and after 10 minutes of reaction, cyclohexane was removed using hot water, and after drying, a terminal-modified conjugated diene-vinyl aromatic hydrocarbon copolymer was obtained. The resulting terminal-modified conjugated diene-vinyl aromatic hydrocarbon copolymer has a weight-average molecular weight of 630000 and a number-average molecular weight of 345000.

Preparation of Rubber Composition 100 parts by weight of the terminal-modified conjugated diene-vinyl aromatic hydrocarbon copolymer above and the substances below were mixed by a Banbury mixer. White carbon (40 parts by weight), oil (10 parts by weight), antioxidant (1 parts by weight), carbon black (20 parts by weight), zinc oxide (3 parts by weight), and steric acid (2 parts by weight) were added and mixed. The mixture was discharged after the temperature was increased to 150° C. and aged for 24 hours. 1.8 parts by weight of CBS, 1.7 parts by weight of DPG, and 1.7 parts by weight of sulfur were added to the discharged gel mixture in a roller mixer for vulcanization to obtain a rubber composition. The material information used in the preparation of the rubber composition is as follows:

a. White carbon (silica, 7000GR, made by ULTRASIL EVONIK)
b. Oil (treated distillate aromatic extract (TDAE), Vivtec 500, made by H&R)
c. Antioxidant (IRGANOX® 1076, made by CIBA)
d. Carbon black (ISAF-HS N234, made by CSRC Group)
e. Zinc oxide (ZnO, made by HA)
f. Stearic acid (TPSA1865)
g. N-cyclohexyl-2-benzothiazole sulfenamide (CBS, made by FLEXSYS)
h. Diphenyl guanidine (DPG, made by FLEXSYS)
i. Sulfur (Triangle Brand)

Examples 3 to 4, Comparative Example 2

The terminal-modified conjugated diene-vinyl aromatic hydrocarbon copolymers and rubber compositions of Examples 3 to 4 and Comparative Example 2 were prepared with the same steps as Example 2. However, the difference is: the amounts (parts by weight) of the first modifier and the second modifier. The individual amounts of the first modifier and the second modifier of Examples 2 to 4 and Comparative Example 2 are as shown in Table 1 below.

TABLE 1

| | Examples | | | Comparative Example |
|---|---|---|---|---|
| | 2 | 3 | 4 | 2 |
| Amount of first modifier (parts by weight) | 0.012 | 0.020 | 0.040 | 0.080 |
| Amount of second modifier (parts by weight) | 0.511 | 0.500 | 0.474 | 0.421 |

Evaluation Method

Measurement of Loss Tangent at 0° C. (tan δ (0° C.)) and Measurement of Loss Tangent at 60° C. (tan δ (60° C.)):

The properties of each rubber composition were measured using a viscoelasticity measuring apparatus with the model number DMA Q800 made by TA Instruments, wherein the measurement mode was stretch mode, the measurement frequency was 20 Hz, the measurement item was tangent (tan δ), the temperature rising rate in the measurement of loss tangent was 3° C./minute, and the temperatures in the measurement of loss tangent were chosen to be 0° C. and 60° C. A higher loss tangent at 0° C. indicates better skid resistance of the rubber composition and a lower loss tangent at 60° C. indicates lower rolling resistance of the rubber composition, such that less fuel of the transportation medium is consumed in tire applications.

Payne Effect (ΔE'=E' (0.5%)−E' (10%)):

The properties of each rubber composition were measured using a viscoelasticity measuring apparatus with the model number DMA Q800 made by TA Instruments. The measurement mode was stretch mode, and the measurement frequency was 20 Hz. The measurement item was dynamic storage elastic modulus (E), the temperature for measuring the dynamic storage elastic modulus (E) was set at 60° C., and the degree of deformation of the measurement was 0.5% to 10%. The dynamic storage elastic modulus difference (ΔE') was obtained by deducting the dynamic storage elastic modulus measured under the degree of deformation of 10% from the dynamic storage elastic modulus measured under the degree of deformation of 0.5%. The smaller the value of the dynamic storage elastic modulus difference (ΔE'), the better the compatibility between the rubber composition with carbon black and white carbon.

The evaluation results of the rubber compositions of Example 1 and Comparative Example 1 are as shown in Table 2.

TABLE 2

|  | Examples 1 | Comparative Example 1 |
|---|---|---|
| Modifier | Compound represented by formula (1) | BY-16-876 |
| Tanδ (0° C.) | 0.63 | 0.54 |
| Tanδ (60° C.) | 0.07 | 0.073 |
| ΔE' (MPa) | 3.18 | 5.48 |

Referring to Table 2, in Example 1, the compound represented by formula (1) was used as the modifier to prepare the rubber composition, and in Comparative Example 1, the compound represented by formula (1) was not used as the modifier to prepare the rubber composition. The experimental results show that, the loss tangent at 0° C. (tan δ (0° C.)) of the rubber composition of Example 1 is higher than that of the rubber composition of Comparative Example 1, indicating the skid resistance of the rubber composition obtained by using the compound represented by formula (1) as the modifier is better. The loss tangent at 60° C. (tan δ (60° C.)) of the rubber composition of Example 1 is lower than that of the rubber composition of Comparative Example 1, indicating the rolling resistance of the rubber composition obtained by using the compound represented by formula (1) as the modifier is lower, such that less fuel of the transportation medium is consumed in tire applications. The dynamic storage elastic modulus difference (ΔE') of the rubber composition of Example 1 is less than that of the rubber composition of Comparative Example 1, indicating the compatibility of the rubber composition obtained by using the compound represented by formula (1) as the modifier and white carbon is better.

The evaluation results of the rubber compositions of Examples 2 to 4 and Comparative Example 2 are as shown in Table 3.

TABLE 3

|  | Examples | | | Comparative Example |
|---|---|---|---|---|
|  | 2 | 3 | 4 | 2 |
| Amount of first modifier (parts by weight) | 0.012 | 0.020 | 0.040 | 0.080 |
| Amount of second modifier (parts by weight) | 0.511 | 0.500 | 0.474 | 0.421 |
| ΔE' (MPa) | 2.341 | 2.339 | 4.488 | 9.609 |

Referring to Table 3, the experimental results show that, the dynamic storage elastic modulus difference (ΔE') of the rubber composition of each of Examples 2 to 4 is less than that of the rubber composition of Comparative Example 2, indicating that based on a total amount of 100 parts by weight of the conjugated diene monomer and the vinyl aromatic hydrocarbon monomer, the use of the first modifier in the amount of 0.010 parts by weight to 0.070 parts by weight and the second modifier in the amount of 0.430 parts by weight to 0.520 parts by weight is better for the compatibility of the rubber composition obtained from the conjugated diene-vinyl aromatic hydrocarbon copolymer having the active terminals with carbon black and white carbon.

The dynamic storage elastic modulus difference (ΔE') of the rubber composition of each of Examples 2 to 3 has a relatively lower value, wherein the amount of the first modifier is 0.010 parts by weight to 0.030 parts by weight and the amount of the second modifier is 0.480 parts by weight to 0.520 parts by weight, indicating that based on a total amount of 100 parts by weight of the conjugated diene monomer and the vinyl aromatic hydrocarbon monomer, the use of the first modifier in the amount of 0.010 parts by weight to 0.030 parts by weight and the second modifier in the amount of 0.480 parts by weight to 0.520 parts by weight is better for the compatibility of the rubber composition obtained from the conjugated diene-vinyl aromatic hydrocarbon copolymer having the active terminals with carbon black and white carbon.

Moreover, the total amount of the first modifier and the second modifier of the rubber composition of each of Examples 2 to 3 is 0.51 parts by weight to 0.55 parts by weight, indicating that based on a total amount of 100 parts by weight of the conjugated diene monomer and the vinyl aromatic hydrocarbon monomer, the use of a total amount of 0.51 parts by weight to 0.55 parts by weight of the first modifier and the second modifier is better for the compatibility of the rubber composition obtained by modifying the conjugated diene-vinyl aromatic hydrocarbon copolymer having the active terminals with carbon black and white carbon.

Based on the above, the invention provides a terminal-modified conjugated diene-vinyl aromatic hydrocarbon copolymer and a synthesis method thereof, a rubber composition, and a tire. The rubber composition obtained from the terminal-modified conjugated diene-vinyl aromatic hydrocarbon copolymer of the invention has excellent skid resistance and low rolling resistance, and has very good compatibility with carbon black and white carbon and can be made into a tire having excellent skid resistance and low rolling resistance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A synthesis method of a terminal-modified conjugated diene-vinyl aromatic hydrocarbon copolymer, comprising:
producing a conjugated diene-vinyl aromatic hydrocarbon copolymer having active terminals comprising a structural unit formed by a conjugated diene monomer and a structural unit formed by a vinyl aromatic hydrocarbon monomer, wherein the conjugated diene-vinyl aromatic hydrocarbon copolymer comprises a plurality of conjugated diene-vinyl aromatic hydrocarbon copolymer chains, each of said conjugated diene-vinyl aromatic hydrocarbon copolymer chains has one active terminal, and a weight ratio of the structural unit formed by the conjugated diene monomer to the structural unit formed by the vinyl aromatic hydrocarbon monomer is from 2:1 to 5:1; and
reacting the conjugated diene-vinyl aromatic hydrocarbon copolymer having the active terminal and a compound represented by formula (1) to produce a conjugated diene-vinyl aromatic hydrocarbon copolymer having terminals modified by the compound represented by formula (1);

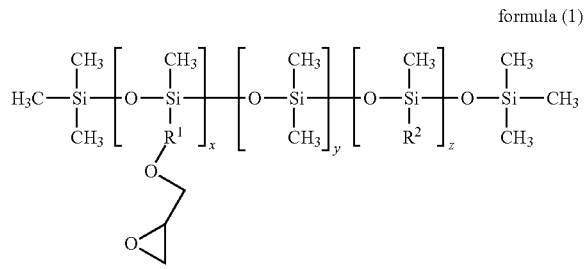

formula (1)

wherein,
$R^1$ is a substituted or unsubstituted $C_2$ to $C_4$ alkylene group,
$R^2$ is a group comprising a substituted or unsubstituted $C_2$ to $C_4$ alkylene group, $-(OC_2H_4)_n-$, and $-OR^3$,
$R^3$ is hydrogen or a substituted or unsubstituted $C_1$ to $C_3$ alkyl group,
n is 3 to 8
x is 25 to 35,
y is 220 to 350,
z is 25 to 35,
a plurality of $R^1$ can be the same or different, and
a plurality of $R^2$ can be the same or different.

2. The synthesis method of the terminal-modified conjugated diene-vinyl aromatic hydrocarbon copolymer of claim 1, wherein
$R^2$ is $-(C_2H_4)-(O-C_2H_4)_n-OR^3$,
$R^3$ is hydrogen or a substituted or unsubstituted $C_1$ to $C_3$ alkyl group, and
n is 3 to 8.

3. The synthesis method of the terminal-modified conjugated diene-vinyl aromatic hydrocarbon copolymer of claim 1, wherein based on a total amount of 100 parts by weight of the conjugated diene monomer and the vinyl aromatic hydrocarbon monomer, an amount of the compound represented by formula (1) is 0.001 parts by weight to 1 parts by weight.

4. A terminal-modified conjugated diene-vinyl aromatic hydrocarbon copolymer, comprising:
a conjugated diene-vinyl aromatic hydrocarbon copolymer having terminals modified by a compound represented by formula (1) produced by modifying a conjugated diene-vinyl aromatic hydrocarbon copolymer having active terminals with the compound represented by formula (1), wherein the conjugated diene-vinyl aromatic hydrocarbon copolymer having the active terminals is formed by a polymerization of a conjugated diene monomer and a vinyl aromatic hydrocarbon monomer in the presence of an organic alkali metal compound, the conjugated diene-vinyl aromatic hydrocarbon copolymer comprises a plurality of conjugated diene-vinyl aromatic hydrocarbon copolymer chains, and each of said conjugated diene-vinyl aromatic hydrocarbon copolymer chains has one active terminal,

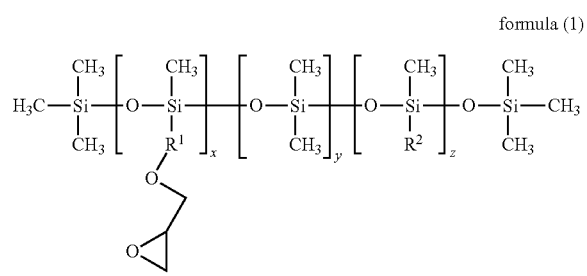

formula (1)

wherein,
$R^1$ is a substituted or unsubstituted $C_2$ to $C_4$ alkylene group,
$R^2$ is a group comprising a substituted or unsubstituted $C_2$ to $C_4$ alkylene group, $-(OC_2H_4)_n-$, and $-OR^3$,
$R^3$ is hydrogen or a substituted or unsubstituted $C_1$ to $C_3$ alkyl group,
n is 3 to 8
x is 25 to 35,
y is 220 to 350,
z is 25 to 35,
a plurality of $R^1$ can be the same or different,
a plurality of $R^2$ can be the same or different, and
in the conjugated diene-vinyl aromatic hydrocarbon copolymer having the terminals modified by the compound represented by formula (1), a weight ratio of a structural unit formed by the conjugated diene monomer to a structural unit formed by the vinyl aromatic hydrocarbon monomer is from 2:1 to 5:1.

5. The terminal-modified conjugated diene-vinyl aromatic hydrocarbon copolymer of claim 4, wherein
$R^2$ is $-(C_2H_4)-(O-C_2H_4)_n-OR^3$,
$R^3$ is hydrogen or a substituted or unsubstituted $C_1$ to $C_3$ alkyl group, and
n is 3 to 8.

6. A rubber composition comprising white carbon and the terminal-modified conjugated diene-vinyl aromatic hydrocarbon copolymer of claims 4.

7. A tire comprising the rubber composition of claim 6.

8. A synthesis method of a terminal-modified conjugated diene-vinyl aromatic hydrocarbon copolymer, comprising:
producing a conjugated diene-vinyl aromatic hydrocarbon copolymer having active terminals comprising a structural unit formed by a conjugated diene monomer and a structural unit formed by a vinyl aromatic hydrocarbon monomer, wherein the conjugated diene-vinyl aromatic hydrocarbon copolymer comprises a plurality of conjugated diene-vinyl aromatic hydrocarbon copolymer chains, each of said conjugated diene-vinyl aromatic hydrocarbon copolymer chains has one active terminal, and a weight ratio of the structural unit formed by the conjugated diene monomer to the structural unit formed by the vinyl aromatic hydrocarbon monomer is from 2:1 to 5:1;

reacting the conjugated diene-vinyl aromatic hydrocarbon copolymer having the active terminals and a first modifier to produce an intermediate product; and reacting the conjugated diene-vinyl aromatic hydrocarbon copolymer having the active terminals remaining in the intermediate product and a second modifier to produce the terminal-modified conjugated diene-vinyl aromatic hydrocarbon copolymer, wherein the first modifier is a compound containing a

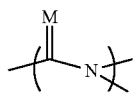

group, and M is a sulfur atom or an oxygen atom, the second modifier is a compound represented by formula (1) below,

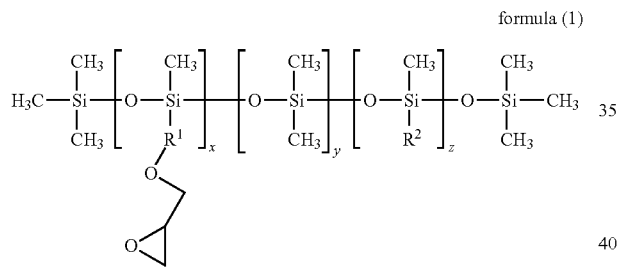

formula (1)

$R_1$ is a substituted or unsubstituted $C_2$ to $C_4$ alkylene group, $R^2$ is a group comprising a substituted or unsubstituted $C_2$ to $C_4$ alkylene group, $-(OC_2H_4)_n-$, and $-OR^3$, $R^3$ is hydrogen or a substituted or unsubstituted $C_1$ to $C_3$ alkyl group, n 3 to 8 x is 25 to 35, y is 220 to 350, z is 25 to 35, a plurality of $R^1$ can be the same or different, a plurality of $R^2$ can be the same or different, and based on a total amount of 100 parts by weight of the conjugated diene monomer and the vinyl aromatic hydrocarbon monomer, an amount of the first modifier is 0.010 parts by weight to 0.070 parts by weight and an amount of the second modifier is 0.430 parts by weight to 0.520 parts by weight.

9. The synthesis method of the terminal-modified conjugated diene-vinyl aromatic hydrocarbon copolymer of claim 8, wherein $R^2$ is $-(C_2H_4)-(O-C_2H_4)_n-OR^3$, $R^3$ is hydrogen or a substituted or unsubstituted $C_1$ to $C_3$ alkyl group, and n is 3 to 8.

10. The synthesis method of the terminal-modified conjugated diene-vinyl aromatic hydrocarbon copolymer of claim 8, wherein based on a total amount of 100 parts by weight of the conjugated diene monomer and the vinyl aromatic hydrocarbon monomer, the amount of the first modifier is 0.010 parts by weight to 0.030 parts by weight and the amount of the second modifier is 0.480 parts by weight to 0.520 parts by weight.

11. The synthesis method of the terminal-modified conjugated diene-vinyl aromatic hydrocarbon copolymer of claim 8, wherein based on a total amount of 100 parts by weight of the conjugated diene monomer and the vinyl aromatic hydrocarbon monomer, a total amount of the first modifier and the second modifier is 0.51 parts by weight to 0.55 parts by weight.

12. The synthesis method of the terminal-modified conjugated diene-vinyl aromatic hydrocarbon copolymer of claim 8, wherein the first modifier comprises an amide compound, an imide compound, a lactam compound, a urea compound, an isocyanuric acid derivative, or a combination thereof.

13. The synthesis method of the terminal-modified conjugated diene-vinyl aromatic hydrocarbon copolymer of claim 8, wherein the first modifier is fonnamide.

14. A terminal-modified conjugated diene-vinyl aromatic hydrocarbon copolymer produced by polymerizing a conjugated diene monomer and a vinyl aromatic hydrocarbon monomer to form a conjugated diene-vinyl aromatic hydrocarbon copolymer and then modifying with a first modifier and a second modifier in order, wherein in the terminal-modified conjugated diene-vinyl aromatic hydrocarbon copolymer, a weight ratio of a structural unit formed by the conjugated diene monomer to a structural unit formed by the vinyl aromatic hydrocarbon monomer is from 2:1 to 5:1, the first modifier is a compound containing a

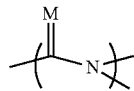

group, and M is a sulfur atom or an oxygen atom, the second modifier is a compound represented by formula (1) below,

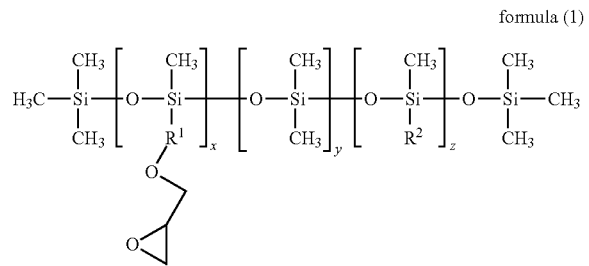

formula (1)

$R^1$ is a substituted or unsubstituted $C_2$ to $C_4$ alkylene group, $R^2$ is a group comprising a substituted or unsubstituted $C_2$ to $C_4$ alkylene group, $-(OC_2H_4)_n-$, and $-OR^3$, $R^3$ is hydrogen or a substituted or unsubstituted $C_1$ to $C_3$ alkyl group, n is 3 to 8
x is 25 to 35,
y is 220 to 350,
z is 25 to 35,
a plurality of $R^1$ can be the same or different,
a plurality of $R^2$ can be the same or different, and
based on a total amount of 100 parts by weight of the structural unit formed by the conjugated diene monomer and the structural unit formed by the vinyl aromatic hydrocarbon monomer, an amount of the first modifier is 0.010 parts by weight to 0.070 parts by weight and an amount of the second modifier is 0.430 parts by weight to 0.520 parts by weight.

15. The terminal-modified conjugated diene-vinyl aromatic hydrocarbon copolymer of claim 14, wherein
$R^2$ is —$(C_2H_4)$—$(O$—$C_2H_4)_n$—$OR^3$,
$R^3$ is hydrogen or a substituted or unsubstituted $C_1$ to $C_3$ alkyl group, and
n is 3 to 8.

16. The terminal-modified conjugated diene-vinyl aromatic hydrocarbon copolymer of claim 14, wherein based on a total amount of 100 parts by weight of the structural unit formed by the conjugated diene monomer and the structural unit formed by the vinyl aromatic hydrocarbon monomer, the amount of the first modifier is 0.010 parts by weight to 0.030 parts by weight and the amount of the second modifier is 0.480 parts by weight to 0.520 parts by weight.

17. The terminal-modified conjugated diene-vinyl aromatic hydrocarbon copolymer of claim 14, wherein the first modifier comprises an amide compound, an imide compound, a lactam compound, a urea compound, an isocyanuric acid derivative, or a combination thereof.

18. The terminal-modified conjugated diene-vinyl aromatic hydrocarbon copolymer of claim 14, wherein the first modifier is formamide.

19. A rubber composition comprising carbon black, white carbon, and the terminal-modified conjugated diene-vinyl aromatic hydrocarbon copolymer of claim 14.

20. A tire comprising the rubber composition of claim 19.

* * * * *